(12) United States Patent
Lustenberger et al.

(10) Patent No.: US 11,880,755 B2
(45) Date of Patent: Jan. 23, 2024

(54) SEMI-SUPERVISED LEARNING WITH GROUP CONSTRAINTS

(71) Applicant: INTERNATIONAL BUSINESS MACHINES CORPORATION, Armonk, NY (US)

(72) Inventors: Patrick Lustenberger, Herrliberg (CH); Thomas Brunschwiler, Thalwil (CH); Andrea Giovannini, Zürich (CH); Adam Ivankay, Zürich (CH)

(73) Assignee: International Business Machines Corporation, Armonk, NY (US)

(\*) Notice: Subject to any disclaimer, the term of this patent is extended or adjusted under 35 U.S.C. 154(b) by 447 days.

(21) Appl. No.: 15/931,706

(22) Filed: May 14, 2020

(65) Prior Publication Data

US 2021/0357704 A1   Nov. 18, 2021

(51) Int. Cl.
| | |
|---|---|
| *G06N 20/10* | (2019.01) |
| *G06N 3/08* | (2023.01) |
| *G06F 18/2411* | (2023.01) |
| *G06F 18/23* | (2023.01) |
| *G06F 18/214* | (2023.01) |
| *G06V 10/762* | (2022.01) |

(Continued)

(52) U.S. Cl.
CPC ........... *G06N 20/10* (2019.01); *G06F 18/214* (2023.01); *G06F 18/23* (2023.01); *G06F 18/2411* (2023.01); *G06N 3/08* (2013.01); *G06V 10/762* (2022.01); *G06V 10/7753* (2022.01); *G06V 10/7784* (2022.01)

(58) Field of Classification Search
None
See application file for complete search history.

(56) References Cited

U.S. PATENT DOCUMENTS

| | | | |
|---|---|---|---|
| 2019/0164054 A1\* | 5/2019 | Lee | G06V 10/7753 |
| 2020/0057944 A1\* | 2/2020 | Loh | G06N 5/003 |
| 2021/0012195 A1\* | 1/2021 | Tsutsumi | G06F 16/288 |

FOREIGN PATENT DOCUMENTS

| | | |
|---|---|---|
| WO | 2018141942 A1 | 8/2018 |
| WO | 2019182593 A1 | 9/2019 |

OTHER PUBLICATIONS

Fischer, Marc, et al. "DI2: Training and querying neural networks with logic." International Conference on Machine Learning. PMLR, 2019. (Year: 2019).\*

(Continued)

*Primary Examiner* — Sean M Conner (74) *Attorney, Agent, or Firm* — Haley J. McClory; Lily Neff (57) ABSTRACT

A computer-implemented method for classification of data by a machine learning system using a logic constraint for reducing a data labeling requirement. The computer-implemented method includes: generating a first embedding space from a first partially labeled training data set, wherein in the first embedding space, content-wise related training data of the first partially labeled training data are clustered together, determining at least two clusters in the first embedding space formed from the first partially labeled training data, and training a machine learning model based, at least in part, on a second partially labeled training data set and the at least two clusters, wherein the at least two clusters are used as training constraints.

17 Claims, 6 Drawing Sheets

(51) Int. Cl.
  *G06V 10/774* (2022.01)
  *G06V 10/778* (2022.01)

(56) References Cited

OTHER PUBLICATIONS

Wu, Yue, et al. "Semi-supervised hyperspectral image classification via spatial-regulated self-training." Remote Sensing 12.1 (2020): 159. (Year: 2020).*

Li, Yang, et al. "Cooperative hybrid semi-supervised learning for text sentiment classification." Symmetry 11.2 (2019): 133. (Year: 2019).*

Zhang, Xue, and Wang-xin Xiao. "Clustering based two-stage text classification requiring minimal training data." 2012 International Conference on Systems and Informatics (ICSAI2012). IEEE, 2012. (Year: 2012).*

Anonymous, "DL2: Training and Querying Neural Networks With Logic", Under review as a conference paper at ICLR 2019, pp. 1-17.

Chen et al., "Word2Vec and Doc2Vec in Unsupervised Sentiment Analysis of Clinical Discharge Summaries", https://www.researchgate.net/publication/324887227, May 2018, pp. 1-24.

Dahal, Paras, "Learning Embedding Space for Clustering From Deep Representations", Research Gate, Conference Paper, Dec. 2018, DOI: 10.1109/BigData.2018.8622629, 10 pages.

Guo et al., "Jointly Embedding Knowledge Graphs and Logical Rules", Proceedings of the 2016 Conference on Empirical Methods in Natural Language Processing, Nov. 1-5, 2016, pp. 192-202.

Hu et al., "Harnessing Deep Neural Networks With Logic Rules", arXiv:1603.06318v5 [cs.LG], Mar. 26, 2019, pp. 1-20.

IP.com, "Machine Learning Datasets Generation Box", IP.com No. IPCOM000254112D, Jun. 1, 2018, pp. 1-8.

Rocktaschel et al., "Injecting Logical Background Knowledge Into Embeddings for Relaxation Extraction", Human Language Technologies: The 2015 Annual Conference of the North American Chapter of the ACL, May 31-Jun. 5, 2015, pp. 1119-1129.

Wang et al., "Learning First-Order LogicEmbeddings via Matrix Factorization", Proceedings of the Twenty-Fifth International Joint Conference on Artificial Intelligence (IJCAI-16), 2016, pp. 2132-2138.

Xu et al., "A Semantic Loss Function for Deep Learning With Symbolic Knowledge", arXiv:1711.11157v2 [cs.AI] Jun. 8, 2018, pp. 1-14.

\* cited by examiner

100

102 generating a first embedding space from first partially labelled training data 104 determining at least two clusters in the first embedding space for the first partially training data 106 training a machine learning model by a machine learning system using second partially labelled training data, as well as the determined clusters as training constraints

SEMI-SUPERVISED LEARNING WITH GROUP CONSTRAINTS

BACKGROUND

The invention relates generally to semi-supervised learning by a machine learning system, and more specifically, to a computer-implemented method for classification of data by a machine learning system using a logic constraint for reducing a data labelling requirement. The invention relates further to a classification system and computer program product for classification of data by a machine learning system using a logic constraint.

Artificial intelligence (AI) is one of the biggest topics in the industry. One of the challenges of this industry trend, which is applicable to a variety of vertical industries, is to correctly train the underlying machine learning models. Recent progress and machine learning performance has partially resulted from the availability of large data sets. Most machine learning tasks rely not only on the data itself, but also data labels for each of the training data points. However, in most cases, adding the metadata in the form of labels to the training data examples is a manual process that requires a large amount of human manpower to equip a machine learning system for supervised learning with correctly labeled training data.

SUMMARY

According to one embodiment of the present invention, computer-implemented method for classification of data by a machine learning system using a logic constraint for reducing a data labeling requirement. The computer-implemented method includes generating a first embedding space from a first partially labeled training data set, wherein in the first embedding space, content-wise related training data of the first partially labeled training data are clustered together. The computer-implemented method further includes, determining at least two clusters in the first embedding space formed from the first partially labeled training data. The computer-implemented method further includes, training a machine learning model based, at least in part, on a second partially labeled training data set and the at least two clusters, wherein the at least two clusters are used as training constraints.

According to another embodiment of the present invention, a computer program product for classification of data by a machine learning system using a logic constraint for reducing a data labeling requirement. The computer program product includes generating a first embedding space from a first partially labeled training data set, wherein in the first embedding space, content-wise related training data of the first partially labeled training data are clustered together. The computer program product further includes determining at least two clusters in the first embedding space formed from the first partially labeled training data. The computer program product further includes, training a machine learning model based, at least in part, on a second partially labeled training data set and the at least two clusters, wherein the at least two clusters are used as training constraints.

According to another embodiment of the present invention, a computer system for classification of data by a machine learning system using a logic constraint for reducing a data labeling requirement. The computer system includes one or more computer processors, one or more computer readable storage media, and program instructions stored on the computer readable storage media for execution by at least one of the one or more processors. The program instructions further include instructions to generate a first embedding space from a first partially labeled training data set, wherein in the first embedding space, content-wise related training data of the first partially labeled training data are clustered together. The program instructions further include instructions to determine at least two clusters in the first embedding space formed from the first partially labeled training data. The program instructions further includes instructions to train a machine learning model based, at least in part, on a second partially labeled training data set and the at least two clusters, wherein the at least two clusters are used as training constraints.

DETAILED DESCRIPTION

Semi-supervised learning methods are currently being studied in an attempt to reduce the number of required labels. In this case, only part of the training data may require labels, while other training data may be used in an unsupervised training mode. However, this approach may not be satisfactory in all cases.

Another approach may be to use additional logic constraints during the training. One of such constraints may be a creation of groups of classes of similar types of training data objects. However, a disadvantage of such an approach may be seen in the fact that these groups may have to be created also by humans which makes this approach also manpower-intensive, time-consuming and thus also impractical.

Yet a further approach may be generating a scoring model used to automatically classify future text samples. The scoring model may be used for active learning and includes operations such as receiving existing text samples and searching a stored, pre-trained corpus that defines embedding vectors for selected words, phrases, or documents to generate nearest neighbor vectors for an embedding vector.

Yet another approach may include training a classifier. Such a system could include two or more classifiers that each analyze features extracted from received data. The system determines a true label for the input data based on a first label and a second label, and re-trains the underlying machine learning model at least once for the first classifier and the second classifier based on a training example comprising the input data and the true label.

However, none of these approaches overcome the performance bottlenecks of current machine learning methods.

Embodiments of the present invention provide for a computer-implemented method, computer program product, and computer system for classification of data by a machine learning system using a logic constraint for reducing a data labeling requirement, which ultimately offers multiple advantages and technical benefits to currently known solutions.

According to various embodiments of the present invention, auto-classification, i.e., determining groups (or clusters) of training data by an embedding step is applied to a first set of training data such that clusters may be identified. The generated clusters may then be used as an additional input in the training process and may act as additional constraints for deriving the machine learning model by the machine learning system. This may improve the accuracy of the trained machine learning model, or when compared to known systems, can reduce the amount of training data while achieving similar accuracy. This may also reduce the time required for the training.

Thus, according to embodiments of the present invention, the use of partially labeled training data may easily be used to perform the semi-supervised learning process. Moreover, according to embodiments of the present invention, the amount of labeled training data in the partially labeled training data set may be reduced while maintaining optimal performance of the machine learning model. As a result, a combination of machine learning techniques may be used to perform the same semi-supervised learning. These machine learning techniques include, but are not limited, to a clustering algorithm and a regular training algorithm with an additional constraint during the learning phase.

The approach above described may be repeated using a predefined performance criterion in order to improve the underlying machine learning model by changing hyper-parameters of the used clustering algorithm without manual intervention. It may also be possible to change the algorithm used for the clustering/grouping. This may be seen as an interpretation of the term "changing hyper-parameters of the used clustering algorithm".

Accordingly, embodiments of the present invention provide for an effective training of a machine learning model using partially labeled training data that reduce time and effort (i.e., overall manpower). Furthermore, the training data for a specific context used in accordance with embodiments of the present invention may come from different sources and may also be available in different formats. Thus, a plurality of different optimization options may be available while, at the same time, obtaining higher accuracy during the inference phase.

In an embodiment, a first partially labeled training data and a second partially labeled training data are not identical but may relate to each other content-wise (i.e., contextually). Because of this, the generation of the embedding space and the cluster determination relate to each other via the underlying context content. For example, if images of cars are trained, it would not make a lot of sense to relate the second training data to cars and the first training data to images of animals, or, in an even more extreme example, to sound files of songs of a musical artist. Therefore, the content or the same context may be the bridge between the first and the second unlabeled training data.

According various embodiments of the present invention, determining the cluster may be performed by at least one clustering algorithm group selected from the group consisting of k-means, Gaussian mixed model (GMM), DBSCAN, expectation maximization, and hierarchical clustering. Any method of statistical analysis capable of determining the cluster, referenced herein, may be used. The selection of the clustering hardware can be made dependent on the content of the first unlabeled training data and the second unlabeled training data.

In an embodiment, the embedding space may be generated using an auto-encoder or a word2vec algorithm. In particular, the word2vec algorithm may be well-suited for the word embedding due to the resulting small cosine distance between objects in the resulting cluster. Additionally, other embedding algorithms may be used. In general, any neural network adapted for dimension reduction (e.g., principal component reduction/principal component analysis), probabilistic models, explainable knowledge base methods, or an explicit representation of the context may be used.

In an embodiment, a quality parameter value is determined, where the quality parameter value is based on an evaluation model, for the trained machine learning model using a plurality of labeled validation samples. In an embodiment, the labeled validation samples may be labeled such that it may be determined whether the machine learning model may deliver the necessary results, or whether the performance in the inference phase is sufficient.

In an embodiment, upon determining that the quality parameter value is below a quality threshold value, changing at least one hyper-parameter of an applied cluster determination algorithm used to determine the at least two clusters. This process may be repeated until an optimal quality parameter value is reached or until a maximum number of iterations has been reached. This allows the control of the training process to remain with the system supervisor.

In an embodiment, the machine learning system may be a neural network system or a support vector machine. Generally, other machine learning architectures that allow loss functions with an applied additional logic constraint may also be used. In some embodiments, a loss function is applied to support a convergence during training of the underlying machine learning model.

In an embodiment, the first partially labeled training data has a particular format. This particular format can include, but is not limited, to text format, sound format, image format and/or video format.

In an embodiment, the second partially labeled training data has a particular format. This particular format can include, but is not limited, to text format, sound format, image format and video format. Consequently, embodiments of the present invention are not limited to any specific context, but may be applied to different formats of the training data used.

In an embodiment, a second embedding space is generated from the partially labeled training data, wherein in the second embedding space, content-wise related ones of a third partially labeled training data are closer to each other (using a related distance measure). This may be repeated for building another constraint for the training of the machine learning system. Thus, the method may be extended to also comprise determining at least two clusters in the second embedding space for the third partially labeled training data, and training the machine learning model by the machine learning system using fourth partially labeled training data as well as the determined logic constraint. Consequently, the training may then be based of the additional set of training data—in particular the fourth training data set—as well as the first and the second logic constraint derived from the groupings in the first embedding space and the second embedding space.

It should be noted that embodiments of the present invention are described with reference to different subject-matter. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, any combination between features relating to different subject-matter, and in particular, between features of the method type claims, and features of the apparatus type claims, is considered as to be disclosed within this document.

In the context of this description, the following terms and/or expressions may be used:

The term "machine learning system" may denote a system applying artificial intelligence and/or machine learning that provides the ability to automatically (or semi-automatically) learn and improve from experience without being explicitly programmed. During a training phase, a machine learning model (i.e., a set of parameters and a specific machine learning system or machine learning algorithms) may be developed using known data, e.g., labeled training data.

The term "machine learning model" may denote the result of a training of a machine learning system comprising a plurality of parameters for a given machine learning architecture. The machine learning architecture may be defined by a set of hyper-parameters, describing logical and/or physical dependencies of components (e.g., nodes) of the machine learning system.

The term "classification" may denote the process of assigning unknown data to one of a given set of predefined classes. The classes may have been defined during a training process of a machine learning system. Upon arrival of a new, unknown data point, the machine learning system may, based on the trained machine learning model, assign the new, unknown data point to one of the classes. This may be performed without explicit, predefined rules.

The term "partially labeled training data" may denote the fact that a data set may have two types of training data or training data points. A part of the training data may have additional metadata in the form of labels, while the second group of the training data may not have the additional metadata in the form of related label values.

In the proposed concept, two kinds of partially labeled training data may be used: at least, a first set of training data and a second set of training data. In general, the two kinds of partially labeled training data may be different, even in their data format, but content-wise they may relate to the same context. For example, if the first partially labeled training data set is related to text snippets relating to the context of "cars" (comprising, e.g., terms like charger, battery, DeWalt, trunk, tool, wheel, Bosch, screw driver), the second partially labeled training data set may relate to images in the context of "cars" (comprising, e.g., images of different types of cars, tools, repair services, garages, and so on).

The term "cluster," or "data cluster," may denote the result of the activity of a cluster analysis or clustering, i.e., grouping of a set of objects in such a way that objects of the same group—denoted as cluster—are more similar (in particular in some context) to each other than to those in other groups, i.e., clusters. This may not be intermixed with a computer cluster of data cluster (which may relate to allocation units of different data files).

The term "logic constraint" may denote additional boundary conditions that may be satisfied in a feedback loop of a machine learning system undergoing a development of a machine learning model during a training phase. Thus, not only the training data may influence the stepwise adaption of parameters of the machine learning system, but also the additional logic constraint may influence the feedback function.

The term "data labeling" may denote the process of adding metadata to a given data element in a data set, i.e., a training data set. These added labels may comprise the desired outcome of the machine learning model in the inference phase. Therefore, labeled training data may include examples of input data and required output data used for training a machine learning system. This data may also be used during a validation phase for a trained machine learning model.

The term "embedding space" may denote a comparably low-dimensional space into which comparably higher dimensional vectors may be transformed. Thus, the transformed vectors comprise fewer dimensions, i.e., fewer features. Alternatively, the distance between vectors in the lower dimensional space is smaller than in the comparably higher dimensional, and in particular, according to a distance function.

The term "content-wise" or "content-wise related," may denote that two expressions or terms have a relationship to a common meaning at a higher context level. As an example, the terms "screwdriver", "hammer" and "wrench" may relate content wise to each other because each of the terms relate to the group tools.

The term "k-means" may denote a clustering algorithm used for vector quantization, often used in the field of cluster analysis or data mining. In general, k-means clustering aims to partition and provide observations regarding the data and form it into k clusters in which youth population belongs to the class with the nearest mean, serving as a prototype of the cluster. The k-means algorithm may be used to group feature vectors of training data.

The term "Gaussian mixed model" may also denote an algorithm often used for finding points that are closer to each other. The Gaussian mixed model algorithm is known as a probabilistic model that assumes all data points e.g., feature vectors may be generated from a mixture of a unit number of Gaussian distributions with unknown parameters. The use of this mixture model can generalize k-means clustering to incorporate information about the covariance structure of the data as well as the centers of the latent Gaussians.

The term "DBSCAN" may denote the known density-based clustering non-parametric algorithm for a given set of points (i.e., feature vectors in a given space). Typically, DBSCAN groups together those feature vectors that are closely packed together (e.g., vectors with many nearby neighbors), and marks as outliers those vectors that are alone or isolated in comparably low-density regions. DBSCAN can advantageously be used for classification tasks.

The term "expectation maximization" may denote the known iterative methods for finding maximum likelihood of maximum a posteriori (MAP) estimates of parameters and statistical models, wherein the model may depend on unobserved latent variables. The expectation maximization iteration may alternate between performing an expect (E) step, which may create a function for the expectation of the log-likelihood evaluated using the current estimate for the parameters, and a maximization step, which determines parameters maximizing the expected lock-likelihood found in the E step.

The term "hierarchical clustering" (or hierarchical cluster analysis, HCA) may denote the known method of cluster analysis which may seek to build a hierarchy of clusters. Bottom-up (agglomerative) as well as top-down (divisive) approaches may be possible. In general, the method groups similar data points or data vectors in such a way that the data vectors in the same group are more similar to each other than other data vectors in other groups. More particularly the method groups similar data points or data vectors according to a likelihood function. However, in any case a similarity function or distance function may also be used.

The term "auto-encoder" may denote a type of artificial neural network and may be used to learn efficient data codings in an unsupervised manner. Generally, the aim of an auto-encoder is to learn a representation (i.e., an encoding) for a data set. This is typically used for dimensionality reduction, where noise in the data set can be ignored by training the network. Hence, auto-encoders may be well suited for dimensionality reduction.

The term "word2vec" may represent a group of related models that may be used to produce word embeddings. These models are shallow and can be two-layer neural networks trained to reconstruct linguistic context of words and/or expressions. It may take as an input a comparably large corpus of text and may produce a vector space (e.g., typically of several hundred dimensions) with each unique word in the corpus being assigned to a corresponding vector in the space. Then, word vectors are positioned in the vector space such that words that share common context in the corpus may be located closer to one another in the space than words unrelated context-wise.

The term "hyper-parameter" may denote parameters describing an architecture of a machine learning system. For example, hyper-parameters may describe the number of layers and the number of nodes in each layer of a neural network and, if the neural network is used for a classification task, the number of output classes. Alternatively, weighing values of the nodes of the neural network does not belong to the hyper-parameters of the neural network. Instead, these values may represent the machine learning model after a respective training.

The term "neural network" may denote a network of circuits of artificial neurons (hence, artificial neural network). The artificial neurons may be implemented as nodes carrying a propagation function with weightings apportioned respectively between particular selected nodes. A neural network typically has an input layer, one or more hidden layers and an output layer of nodes. If used for a classification task, the output layer may directly relate to the classes into which input vectors may be classified.

The term "support vector machine," also denoted as support vector network, may denote a machine learning system with an associated learning algorithm that may analyze data used for classification and regression analysis. Given a set of training examples, where each one is marked as belonging to one or the other of such categories, the support vector machine training algorithms build a model that assigns new examples to one category or the other, to make it a non-probabilistic binary linear classifier.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The aspects defined above, and further aspects of the present invention, are apparent from the examples of embodiments to be described hereinafter and are explained with reference to the examples of embodiments, but to which the invention is not limited. Preferred embodiments of the invention will be described, by way of example only, and with reference to the Figures. Firstly, a block diagram of an embodiment of the inventive computer-implemented method for a classification of data by a machine learning system using a logic constraint for reducing a data labeling requirement is given. Afterwards, further embodiments, as well as embodiments of the system for reducing a data labeling requirement classification system for a classification of data by a machine learning system using a logic constraint, will be described.

Figure 1:
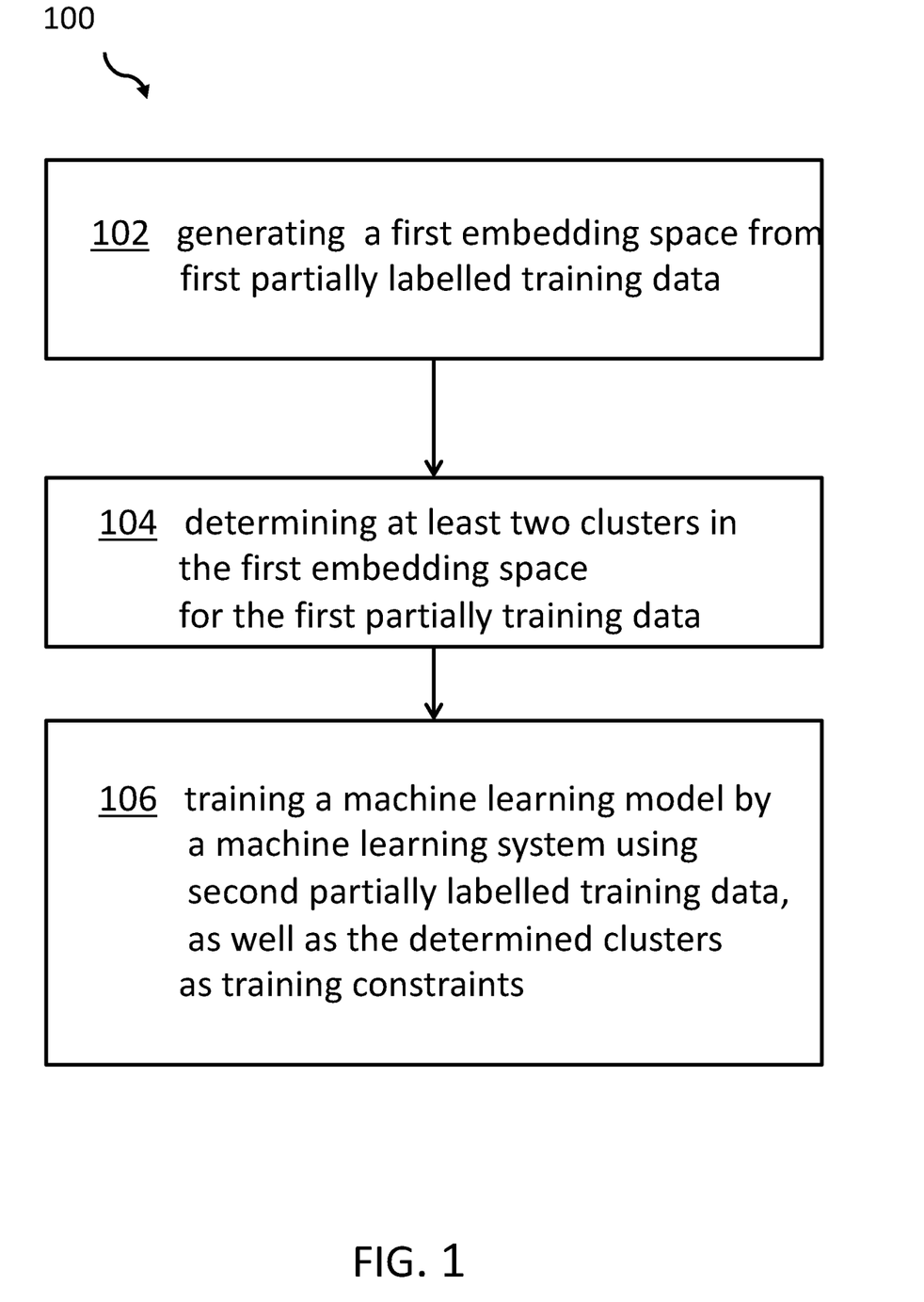
FIG. 1 depicts a flowchart diagram for classification of data by a machine learning system using a logic constraint for reducing a data labeling requirement in accordance with at least one embodiment of the present invention.

FIG. 1 depicts a flowchart diagram 100 for classification of data by a machine learning system using a logic constraint for reducing a data labeling requirement in accordance with at least one embodiment of the present invention. At step 102, an embedding space is generated from first partially labeled training data. In various embodiments, the percentage of labeled training data of a given set of training data is based on a predetermined percentage. For example, 20% of the training data may be labeled, while 80% of the training data is unlabeled. However, these percentages may be a guidance value. In real implementations, the percentage of labeled training data may even be below the values given above.

It should be appreciated that in the embedding space, content-wise related ones of the first partially labeled training data are closer to each other; i.e., they may have a shorter distance in the data space with less dimensions than in the originally created data space.

At step 104, at least two clusters in the embedding space (e.g., by k-means, or others) are determined for the first partially labeled training data. At step 106, a machine learning model is trained by the machine learning system based, at least in part, on second partially labeled training data and the at least two clusters (determined in step 104), used as training constraints. Therefore, a semi-supervised learning process is performed using a group constraint, wherein the constraint is derived out of the first partially labeled training data.

It may also be noted that instead of partially labeled training data, a fully labeled training data may be used.

Figure 2:
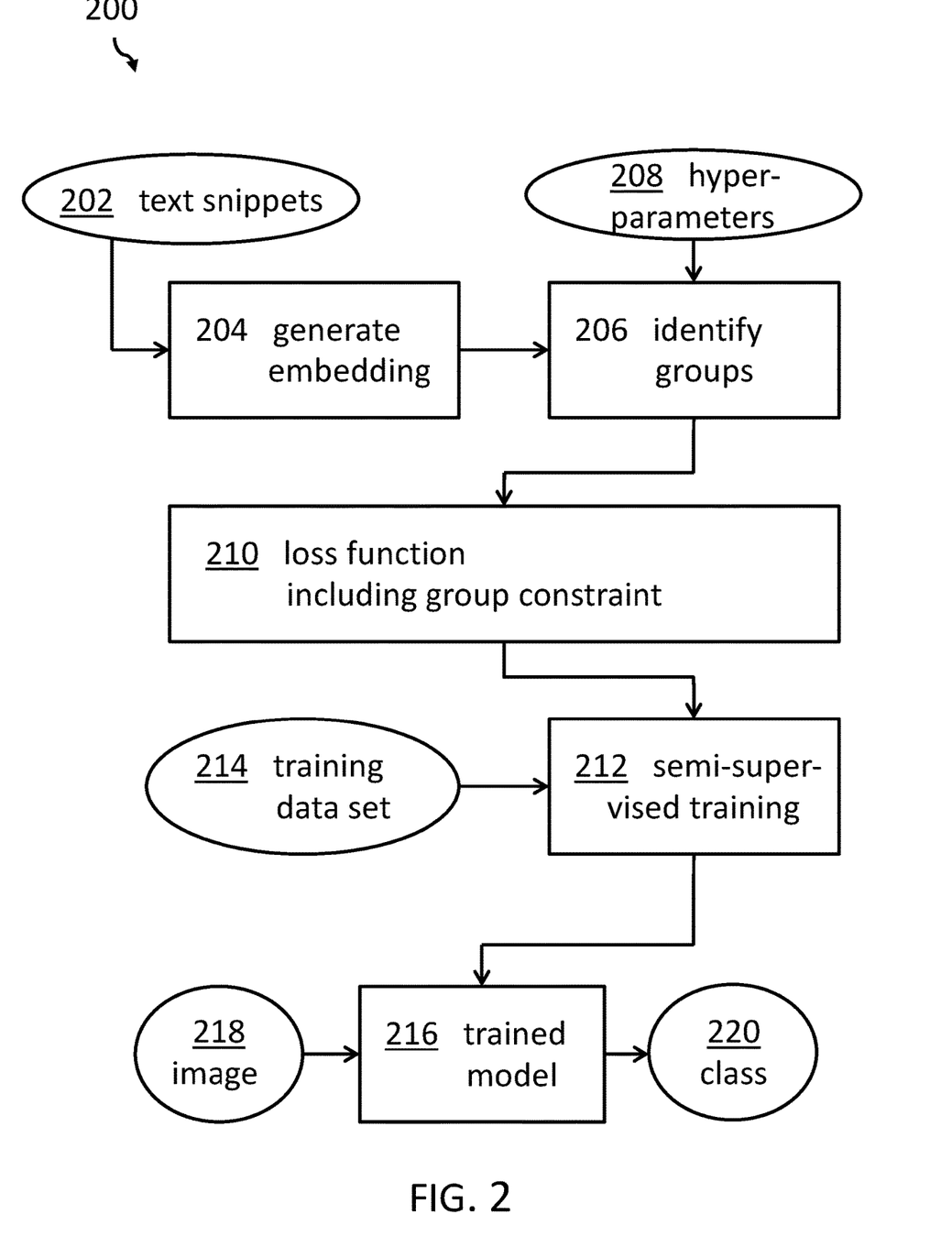
FIG. 2 depicts a flowchart diagram of a method in accordance with at least one embodiment of the present invention.

FIG. 2 shows a flowchart diagram, generally designated 200, depicting a method in accordance with at least one embodiment of the present invention. As shown in FIG. 2, text snippets 202 are used as input for the generation 204 of the embedding. Based on a set of hyper-parameters 208, the method identifies groups at 206 within the embedding space generated at 204. Based on these determined groups, a loss function is derived at 210, including the group constraint. This group constraint is then used for semi-supervised training at 212, in which the loss function is used as an additional logical condition during the training of the machine learning model. This is generally based on the training data set 214. The result is the trained model 216, which may be used in an inference phase to predict classes 220 from input data, e.g., images 218.

Figure 3:
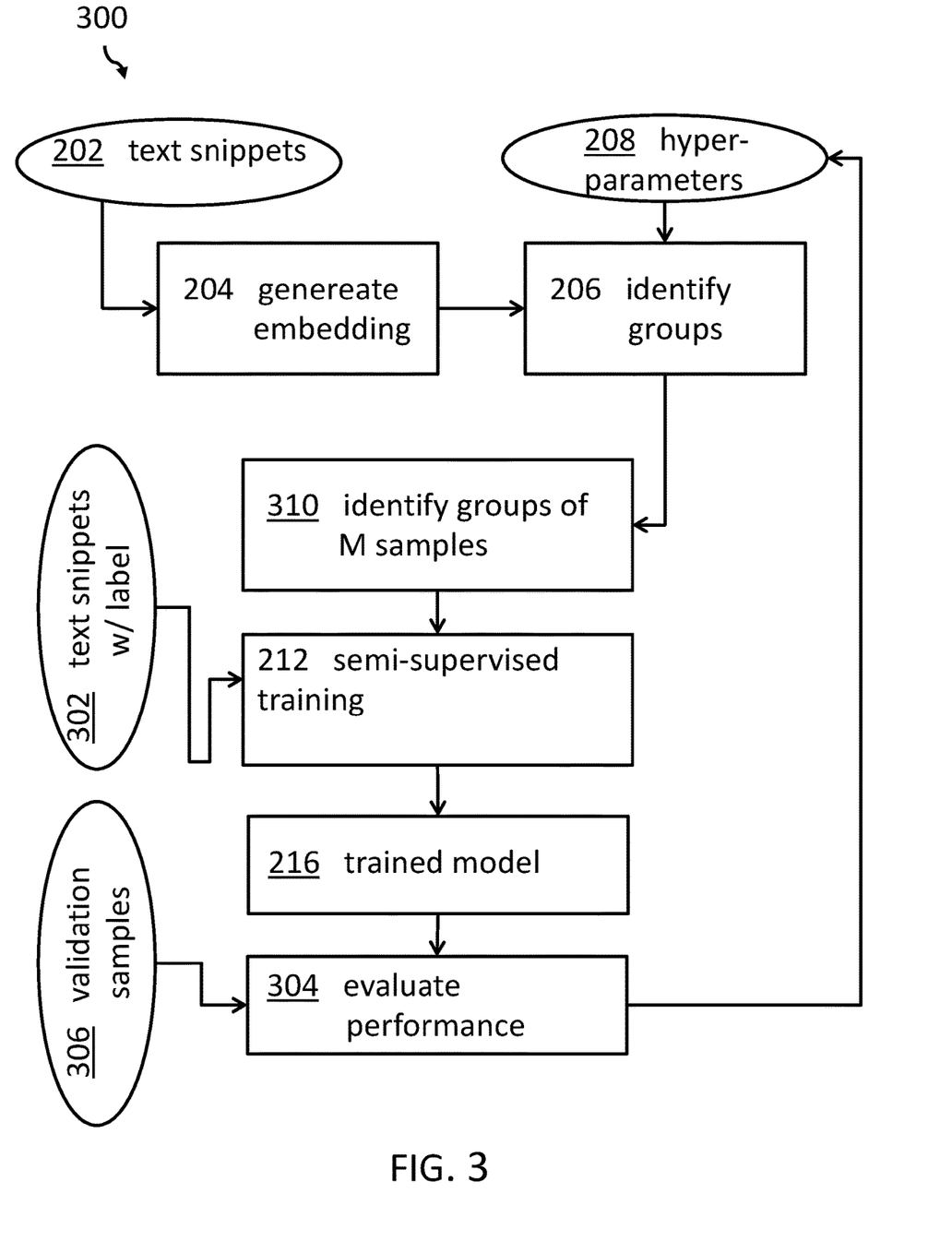
FIG. 3 depicts a flowchart diagram of a method for a training phase in accordance with at least one embodiment of the present invention.

FIG. 3 depicts a flowchart diagram of a method for a training phase, generally designated 300, in accordance with at least one embodiment of the present invention. Text snippets 202 are used as input for generating the embedding space at 204. For example, N text snippets without a label and M snippets with a label are used. Hyper-parameters 208 for the grouping algorithms are used to identify groups within the embedding space at 206.

The groups are identified at 310. Groups may include, for example, M samples by a mapping between regions of the embedding space and the associated group. This may represent a step of clustering in the method during the training phase. Next, the M text snippets 302 are used with the additional logic constraint of the above identified groups at 310 for training the semi-supervised model at 212. As a result, a trained machine learning model is generated at 216.

In an embodiment, the performance of the trained machine learning model, using validation samples 306, is evaluated at 304. Evaluating the performance of the trained machine learning model includes testing the trained machine learning model against a predefined quality parameter value. If the predefined quality parameter value is not met, a feedback loop to the setting of the hyper-parameters 208 is used to influence or modify at least one hyper-parameter 208.

The complete training steps may then be repeated with the changed hyper-parameter(s) 208 until the predefined quality parameter is met. Alternatively, the iteration can be stopped when an optimum within the determined quality parameter has been reached or a maximum number of iterations has been reached.

Figure 4:
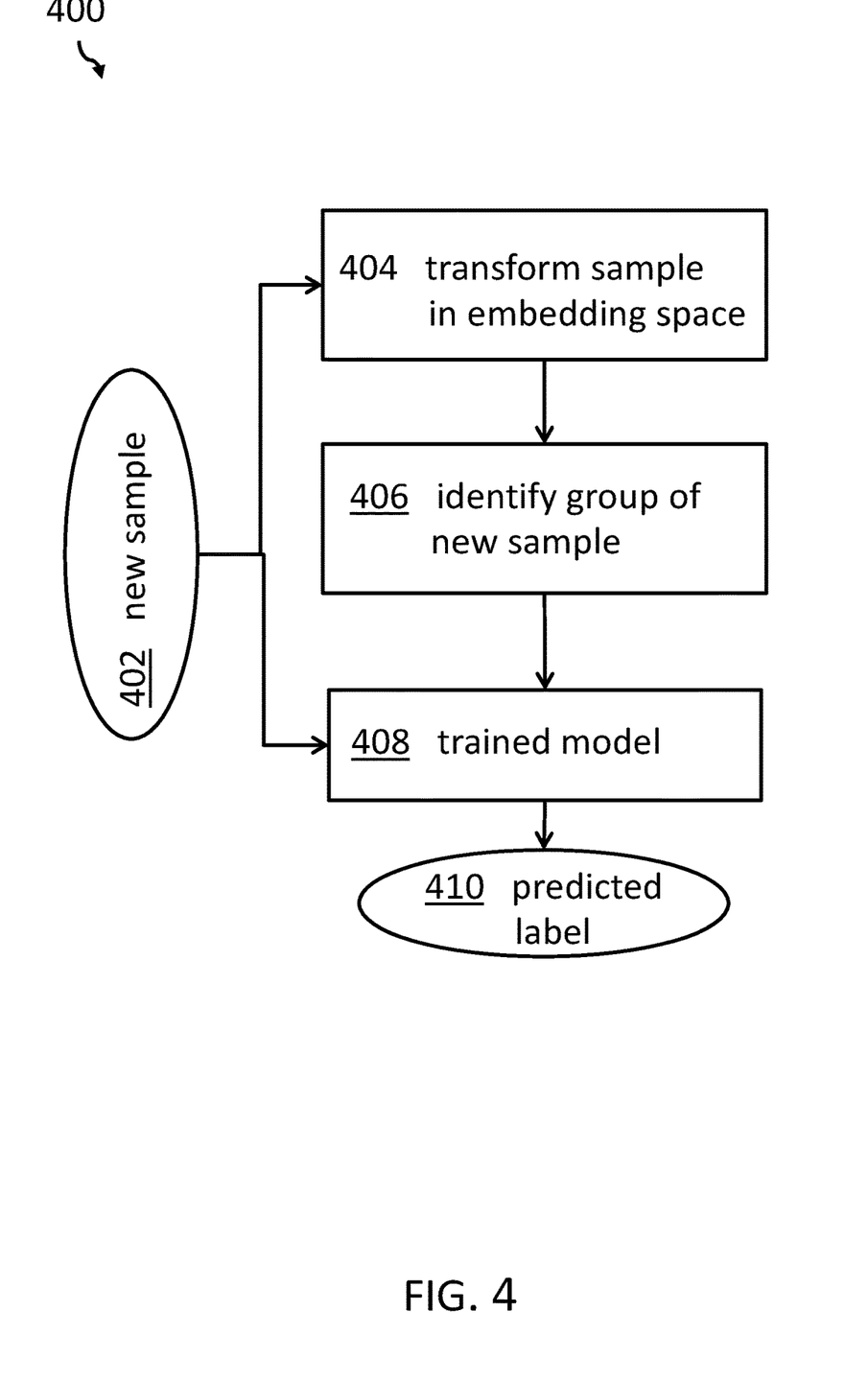
FIG. 4 depicts a flowchart diagram of a method for an inference phase in accordance with at least one embodiment of the present invention.

FIG. 4 depicts a flowchart diagram of a method for operational steps in an inference phase, generally designated 400, in accordance with at least one embodiment of the present invention. It should be noted that a trained machine learning model is a prerequisite to entering the interference phase. This may have been generated according to the method steps shown in FIG. 3.

If a new sample 402 is available for classification, the new sample 402 is used as input data for training the machine learning model at 408 while also being transformed to the embedding space at 404. At 406, the group is identified for new sample 402. The groups in general are determined during the training phase according to FIG. 3, and during the clustering step in the embedding space. The identified group is then used as an additional parameter in the machine learning model during the inference phase. This enables the inference phase to predict the label of the class at 410.

Figure 5:
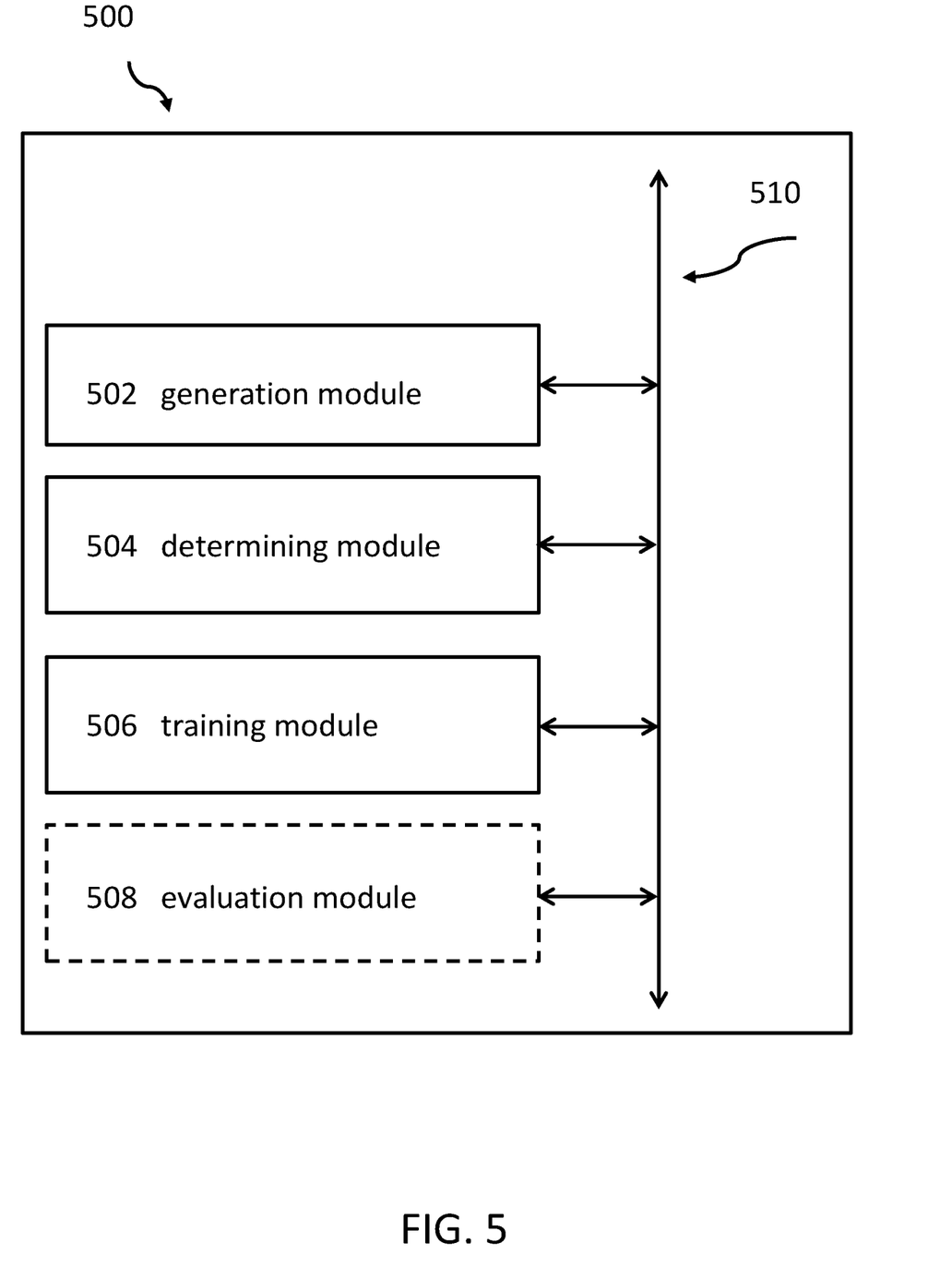
FIG. 5 depicts a functional block diagram including modules of a classification system for classification of data by a machine learning system using a logic constraint for reducing a data labeling requirement.

FIG. 5 depicts a functional block diagram including modules of a classification system, generally designated 500, for classification of data by a machine learning system using a logic constraint for reducing a data labeling requirement. Classification system 500 comprises generation module 502, adapted for generating an embedding space from first partially labeled training data. As a result of the generated embedding space, the content-wise related ones of the first partially labeled training data of the embedding space are closer to each other.

Classification system 500 further comprises determining module 504, adapted for determining at least two clusters in the embedding space for the first partially labeled training data, and training module 506, adapted for training a machine learning model using machine learning system. The machine learning system uses second partially labeled training data as well as the determined clusters as training constraints for training the machine learning model. In some embodiments, classification system 500 may optionally further include evaluation (i.e., assessment) module 508.

Evaluation module 508 may be used to evaluate or validate the quality or performance of the trained machine learning model.

It may also be noted that the modules and units of classification system 500, including generation module 502, determining module 504, training module 506, and optionally, evaluation module 508, may be electrically connected for a signal exchange. Alternatively, generation module 502, determining module 504, training module 506, and optionally, evaluation module 508 may be connected to a classification system-internal bus system 510 for a mutual data exchange.

Figure 6:
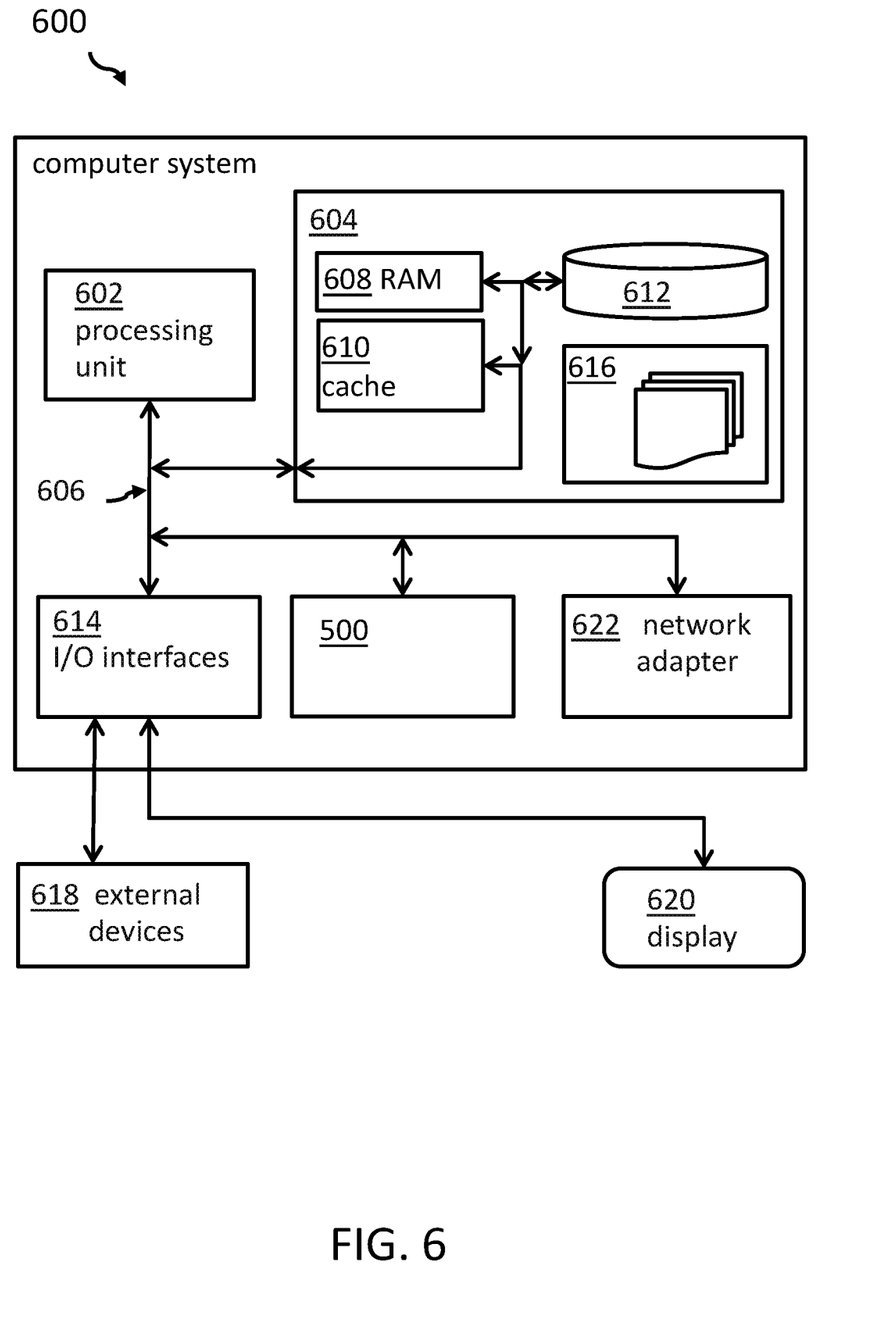
FIG. 6 depicts a block diagram depicting components of a computing device, generally designated 600, suitable for executing the classification system 500 of FIG. 5 in accordance with at least one embodiment of the present invention.

Embodiments of the invention may be implemented together with virtually any type of computer, regardless of the platform being suitable for storing and/or executing program code. FIG. 6 is a block diagram depicting components of a computing device, generally designated 600, suitable for executing the classification system 500 of FIG. 5 in accordance with at least one embodiment of the present invention.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As depicted in FIG. 6, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the classification system 600 for a classification of data by a machine learning system using a logic constraint may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

What is claimed is:

1. A computer-implemented method for classification of data by a machine learning system, the computer-implemented-method comprising:
    generating a first and a second partially labelled training data set from a plurality of obtained data, wherein said first and second partially labelled data set are a subset of said plurality of obtained data and said first and second data set have a content and a context that are not identical but related to one another;
    generating a plurality of logic constraints based on said content and context of said first and second partially labelled data set using at least one statistical analysis model;
    generating a first embedding space from said first partially labeled training data set, wherein in the first embedding space, content relates to the first partially labeled training data;
    determining at least two clusters in the first embedding space formed from the first partially labeled training data, wherein the at least two clusters are determined using at least one hyper-parameter associated with a clustering algorithm;
    training a support vector machine based, at least in part, on a second partially labeled training data set and the at least two clusters wherein the at least two clusters are used as training constraints;
    determining a parameter value is below a threshold parameter value; and
    performing one or more repetitions using a predefined performance criterion, wherein the predefined performance criterion changes the at least one hyper-parameter of the clustering algorithm, responsive to determining the parameter value is below the threshold parameter value, until an optimal quality parameter value is reached.

2. The computer-implemented method of claim 1, wherein the first partially labeled training data set and the second partially labeled training data set relate to each other content-wise, but are not identical.

3. The computer-implemented method of claim 1, wherein said statistical analysis model includes algorithm selected from the group consisting of: k-means, Gaussian mixed model, DB SCAN, expectation maximization, and hierarchical clustering.

4. The computer-implemented method of claim 1, wherein the first embedding space is generated based, at least in part, on at least one of an auto-encoder and a word2vec algorithm.

5. The computer-implemented method of claim 1, further comprising:
determining the parameter value for the machine learning model from a plurality of labeled validation samples.

6. The computer-implemented method of claim 1, wherein a format of the first partially labeled training data is selected from the group consisting of a text format, a sound format, an image format, and a video format.

7. The computer-implemented method of claim 1, wherein a format of the second partially labeled training data is selected from the group consisting of a text format, a sound format, an image format, and a video format.

8. The computer-implemented method of claim 1, wherein generating the first embedding space from the first partially labeled training data set further comprises:
generating a second embedding space from the second partially labeled training data set, wherein in the second embedding space, content-wise related training data of the first partially labeled training data are clustered together.

9. The computer-implemented method of claim 1, wherein generating a second embedding space from the second partially labeled training data set further comprises:
generating a third embedding space from a third partially labeled training data set, wherein in the third embedding space, content-wise related training data of the second partially labeled training data are clustered together.

10. A computer system for classification of data by a machine learning system, the computer system comprising a processor configured to:
generating a first and a second partially labelled training data set from a plurality of obtained data, wherein said first and second partially labelled data set are a subset of said plurality of obtained data and said first and second data set have a content and a context that are not identical but related to one another;
generating a plurality of logic constraints based on said content and context of said first and second partially labelled data set using at least one statistical analysis model;
generating a first embedding space from said first partially labeled training data set, wherein in the first embedding space, content relates to the first partially labeled training data;
determining at least two clusters in the first embedding space formed from the first partially labeled training data, wherein the at least two clusters are determined using at least one hyper-parameter associated with a clustering algorithm;
training a support vector machine based, at least in part, on a second partially labeled training data set and the at least two clusters, wherein the at least two clusters are used as training constraints;
determining a parameter value is below a threshold parameter value; and
performing one or more repetitions using a predefined performance criterion, wherein the predefined performance criterion changes the at least one hyper-parameter of the clustering algorithm, responsive to determining the parameter value is below the threshold parameter value, until an optimal quality parameter value is reached.

11. The computer system of claim 10, wherein the first partially labeled training data set and the second partially labeled training data set relate to each other content-wise, but are not identical.

12. The computer system of claim 10, wherein said statistical analysis model includes algorithm selected from the group consisting of: k-means, Gaussian mixed model, DB SCAN, expectation maximization, and hierarchical clustering.

13. The computer system of claim 10, wherein the first embedding space is generated based, at least in part, on at least one of an auto-encoder and a word2vec algorithm.

14. The computer system according to claim 10, further comprising:
determining a parameter value for the machine learning model from a plurality of labeled validation samples.

15. The computer system of claim 10, wherein a format of the first partially labeled training data is selected from the group consisting of a text format, a sound format, an image format, and a video format.

16. The computer system of claim 10, wherein a format of the second partially labeled training data is selected from the group consisting of a text format, a sound format, an image format, and a video format.

17. A computer program product for a classification of data by a machine learning system, the computer program product comprising one or more computer readable storage media and program instructions stored on the one or more computer readable storage media, the program instructions including instructions to:
generate a first and a second partially labelled training data set from a plurality of obtained data, wherein said first and second partially labelled data set are a subset of said plurality of obtained data and said first and second data set have a content and a context that are not identical but related to one another;
generate a plurality of logic constraints based on said content and context of said first and second partially labelled data set using at least one statistical analysis model;
generate a first embedding space from said first partially labeled training data set, wherein in the first embedding space, content relates to the first partially labeled training data;
determine at least two clusters in the first embedding space formed from the first partially labeled training data, wherein the at least two clusters are determined using at least one hyper-parameter associated with a clustering algorithm;
train a support vector machine based, at least in part, on a second partially labeled training data set and the at least two clusters, wherein the at least two clusters are used as training constraints;
determining a parameter value is below a threshold parameter value; and
perform one or more repetitions using a predefined performance criterion, wherein the predefined performance criterion changes the at least one hyper-parameter of the clustering algorithm, responsive to determining the parameter value is below the threshold parameter value, until an optimal quality parameter value is reached.

* * * * *